US007876912B2

(12) United States Patent
Liu et al.

(10) Patent No.: US 7,876,912 B2
(45) Date of Patent: Jan. 25, 2011

(54) DUAL MODE HEADSET DEVICE

(75) Inventors: Chun-Hsin Liu, Taipei County (TW); Meng-Yuan Liu, Taipei County (TW); Shih-Wei Fang, Taipei County (TW); Kuo-Ching Chang, Taipei County (TW); Jui-Chi Liao, Taipei County (TW); Chi-Hsiang Chen, Taipei County (TW)

(73) Assignee: Lite-On Technology Corp., Taipei (TW)

( * ) Notice: Subject to any disclaimer, the term of this patent is extended or adjusted under 35 U.S.C. 154(b) by 1091 days.

(21) Appl. No.: 11/564,853

(22) Filed: Nov. 30, 2006

(65) Prior Publication Data

US 2007/0253579 A1 Nov. 1, 2007

(30) Foreign Application Priority Data

Apr. 26, 2006 (TW) .............................. 95207122 U

(51) Int. Cl.
*H04R 1/10* (2006.01)
*H04R 25/00* (2006.01)
*H04M 1/00* (2006.01)

(52) U.S. Cl. ...................... 381/74; 381/384; 455/569.1; 455/575.3

(58) Field of Classification Search ................... 381/74, 381/309, 311, 334, 370, 384; 379/420.02, 379/420.03, 428.01, 433.01, 434; 455/566.1, 455/569.1, 575.1
See application file for complete search history.

(56) References Cited

U.S. PATENT DOCUMENTS

| | | | | |
|---|---|---|---|---|
| 5,600,719 | A * | 2/1997 | Lovecky et al. | 379/438 |
| 6,233,343 | B1 * | 5/2001 | Muranami et al. | 381/96 |
| 7,418,277 | B2 * | 8/2008 | Tsai | 455/569.2 |
| 2003/0073460 | A1 * | 4/2003 | van Pelt et al. | 455/556 |
| 2007/0287380 | A1 * | 12/2007 | Hui et al. | 455/41.1 |

* cited by examiner

*Primary Examiner*—Ping Lee
(74) *Attorney, Agent, or Firm*—Rosenberg, Klein & Lee

(57) ABSTRACT

The invention provides a headset device. The headset device includes a first headset, a second headset, and a transmission line. The first headset includes a first housing; an interface module for receiving an audio signal; a signal processing module for separating the audio signal into a first channel signal and a second channel signal; an amplifying circuit for respectively amplifying the first channel signal and the second channel signal to generate a first amplified signal and a second amplified signal; and a first speaker for outputting audio according to the first amplified signal. The second headset includes a second housing, and a second speaker for outputting audio according to the second amplified signal. The transmission line is for transmitting the second amplified signal to the second headset.

17 Claims, 9 Drawing Sheets

DUAL MODE HEADSET DEVICE

BACKGROUND OF THE INVENTION

1. Field of the Invention

The invention relates to an audio playing device, and more particularly, to a duel mode headset.

2. Description of the Prior Art

In the modern world, many multimedia products are available on the market. As well as more practical functions, computers, cell phones, and MP3 players can provide users with many kinds of entertainment. Portable electronic products are equipped with headsets in order to offer the best entertainment and convenience. There are two types of commercial headsets available, namely mono headsets and stereo headsets. The former can be applied in hands free cell phones. When the headsets are connected to bluetooth modules, users can answer phone calls through the headsets directly. In general, for purposes of convenience, mono headsets are designed to be small and delicate. Mono headsets, however, are not suitable for listening to stereo music, not only because they comprise only one earphone but also because the sound is limited to the vocal frequency range of (300 Hz~3 KHz).

Stereo headsets are mostly used when users wish to listen to music as they have two earphones for creating stereo sound. There are three types of stereo headsets: head-wear headsets, neck-wear headsets, and ear-wear headsets. Most bluetooth stereo headsets in cell phones can support the function of answering phone calls, but they are often too large to be smoothly collected. They are therefore less practical than mono headsets if they are applied in hands free earphone devices for receiving phone calls.

SUMMARY OF THE INVENTION

The invention provides a headset that has the advantages of convenience, typically characterized by mono headsets, and good audio quality, typically characterized by stereo headsets. The invention comprises two earphones that can be separated. Therefore, a user can alternate between wearing only one earphone for answering phone calls, and wearing two earphones for listening to music. The disadvantages of mono headsets and stereo headsets are thereby managed.

According to one embodiment of the invention, a headset device is disclosed. The headset device includes a first headset, a second headset, and a transmission line. The first headset includes a first housing; an interface module for receiving an audio signal; a signal processing module for separating the audio signal into a first channel signal and a second channel signal; an amplifying circuit for respectively amplifying the first channel signal and the second channel signal to generate a first amplified signal and a second amplified signal; and a first speaker for outputting audio according to the first amplified signal. The second headset includes a second housing; and a second speaker for outputting audio according to the second amplified signal. The transmission line is for transmitting the second amplified signal to the second headset.

According to another embodiment of the invention, a headset device is disclosed. The headset device comprises: a housing; a second speaker, set into the housing, for outputting a corresponding sound of an amplified signal; and a transmission line, connected to the speaker, wherein the end of the transmission line is connected to a universal serial bus (USB) plug.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
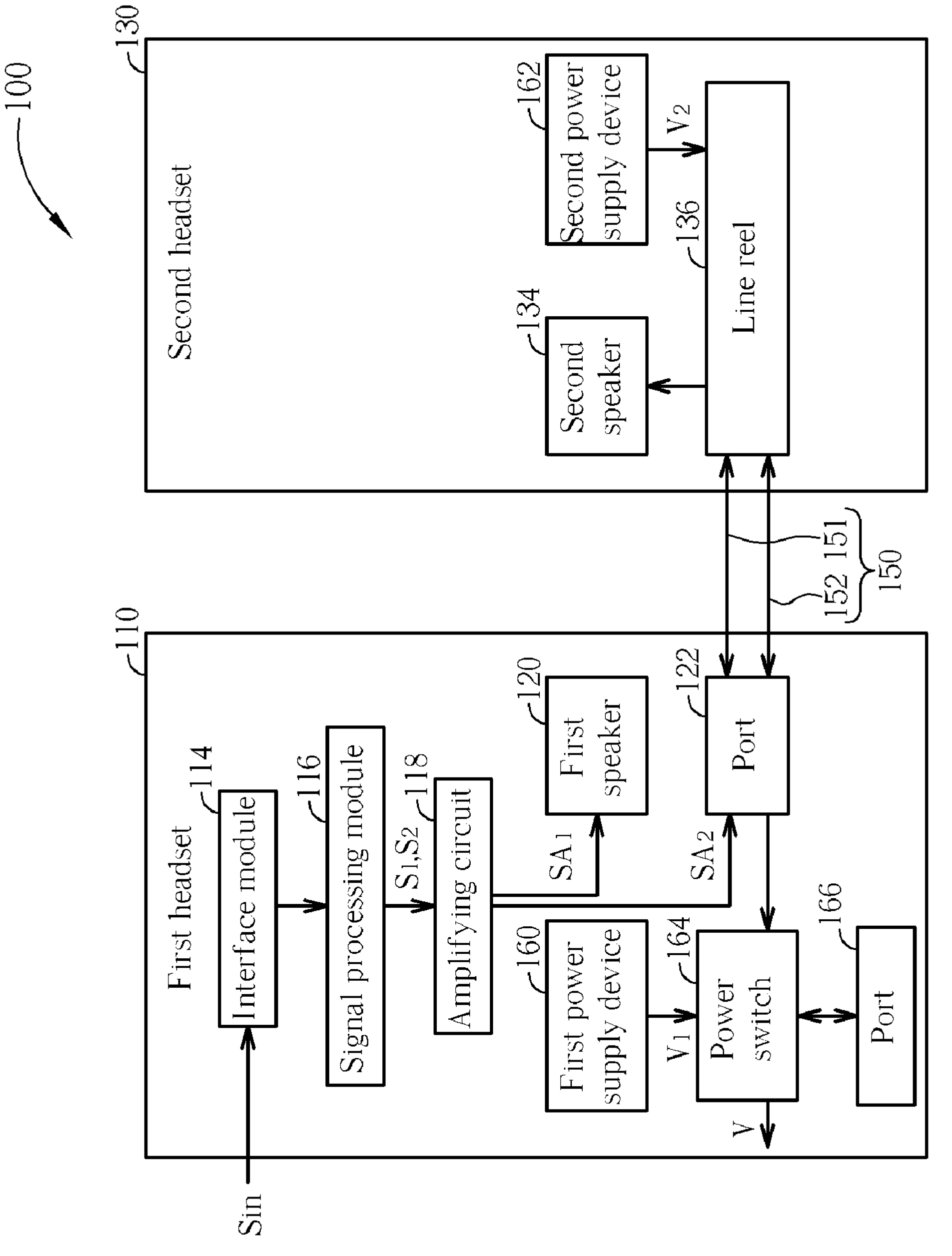
FIG. 1 is a block diagram of a headset device according to an embodiment of the invention.

Please refer to FIG. 1. FIG. 1 is a block diagram of a headset device 100 according to an embodiment of the invention. As shown in FIG. 1, the headset device 100 comprises a first headset 110, a second headset 130, and a transmission line 150. An audio signal is transmitted to the first headset 110 through a wire/wirelessly. The headset 110 will produce a first amplified signal based on the signal (ex. the audio signal corresponding to the left sound track) and a second amplified signal (ex. the audio signal corresponding to the right channel). If the second headset 130 is not connected to the first headset 110 by the transmission line 150, the first headset 110 will output sound corresponding to the first amplified signal and be used as a mono headset. On the other hand, if the second headset 130 is connected to the first headset 110 by the transmission line 150, the first headset 110 will transmit the second amplified signal through the transmission line 150 to the second headset 130. When this is the case, the first headset 110 will play sound corresponding to the first amplified signal and the second headset 130 will play sound corresponding to the second amplified signal. In this way, the first headset 110 and the second headset 130 are combined to function as a stereo headset.

As shown in FIG. 1, the first headset 110 is installed with an interface module 114, a signal processing module 116, an amplifying circuit 118 and a speaker 120. The interface module, provided by an external device (such as a cell phone or an MP3 player), is used to receive an audio signal $S_{in}$.

A signal processing module 116 is connected to the interface module 114 in order to separate the audio signal $S_{in}$ into a first channel signal $S_1$ and a second channel signal $S_2$. If the first channel signal $S_1$ corresponds to the left channel, the second channel signal $S_2$ will correspond to the right channel, and vice versa.

An amplifying circuit 118 is connected to the signal processing module 116 for amplifying the first channel signal $S_1$, which will then be separated into a first amplified signal $SA_1$ and a second amplified signal $SA_2$. A first speaker 120 is connected to the amplifying circuit 118 to output sound according to the first amplified signal $SA_1$.

The second headset 130 includes a second speaker 134. When the second headset 130 is connected to the first headset 110 by the transmission line 150, the second speaker 134 can receive the second amplified signal and then output a corresponding sound. In the embodiment, the transmission line 150 includes an audio line 151 and a power line 152, wherein the audio line 151 is used to connect the amplifying circuit 118 to the second speaker 134 in order to transmit the second amplified signal $SA_2$ to the second headset 130. As a result, the other channel can play the sound.

Figure 2:
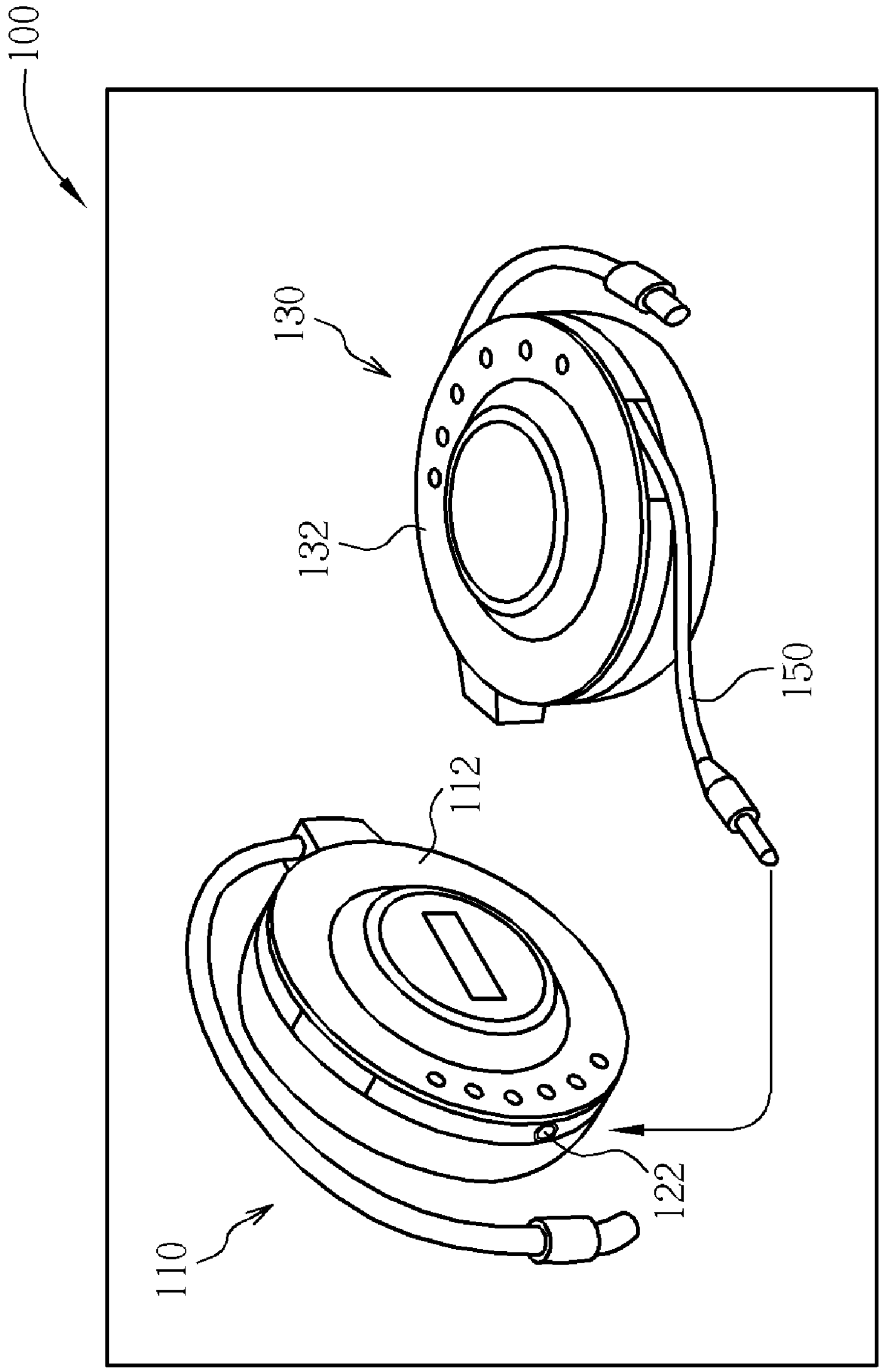
FIG. 2 is the exterior view of the headset device in FIG. 1.

In the embodiment, the second headset has a line reel 136 which can collect the transmission line 150. In other words, one end of the transmission line is fixed to the line reel 136, and the other end is connected to a port 122 of the first headsets 110 by being plugged into it. Please refer to FIG. 2. FIG. 2 is the exterior view of the headset device 100 in FIG. 1. As shown in FIG. 2, the first headset 110 has a first housing 112 to protect and fix the interior elements (i.e. the interface module 114, the signal processing module 116, the amplifying circuit and the first speaker 120). The first housing 112 further includes the port 122. In the same manner, the second headset 130 has a second housing 132 to protect and fix the interior elements (i.e. the line reel 136 and the second speaker 134). If the first headset is used as a mono headset, the interior mechanism provides the same function as the prior art. If users require a stereo headset, however, the transmission line 130 can be pulled out to a suitable length from the line reel 136 and be plugged into the port 122. As a result, the audio line 151 of the transmission line 150 can transmit the second amplified signal to the second headset 130. When the second speaker 134 is driven, the users will hear stereo sound.

As shown in FIG. 1, the first headset 110 is further equipped with a first power supply device 160 and a power switch 164. The second headset 130 is further equipped with a second power supply device 162. The first power supply 160 provides the first headset with power. The power switch 164 is used to switch the voltage V1 supplied by the first power supply device 160 to the voltage V2 supplied by the second power supply device 162. Please note that the second power supply device 162 is also the power source of the second headset 130. In the embodiment, when the first headset 110 is used as a mono headset only, the power switch 164 will choose the first power supply device 160 to provide the first headset 110 with a voltage V required to enable the first headset 110 to function (V=V1). When the second headset 130 is connected to the first headset 110 by the transmission line 150 to form a stereo headset, however, the power line 152 in the transmission line 150 will connect the second power supply device 162 to the power switch 164. In this case, the power switch 164 will choose the second power supply 162 to provide the first headset 110 with the voltage V (V=V2) required to enable the first headset 110 to function. Thereafter, the lifespan of the first power supply device 160 is increased.

In the embodiment, the first power supply device 160 includes batteries and a charger. The power supply 160 can be charged from an external power supply through the port. The second power supply device 162 includes batteries and a charger. In other words, the second power supply device can also be charged by an external power supply through the power line 152. Please note that the invention is not limited to this embodiment. In other embodiments, even if the first headset 110 is without the port 166, and both the first power supply device 160 and the second power supply 162 are regular batteries, such a modification still falls within the scope of the invention.

Figure 3:
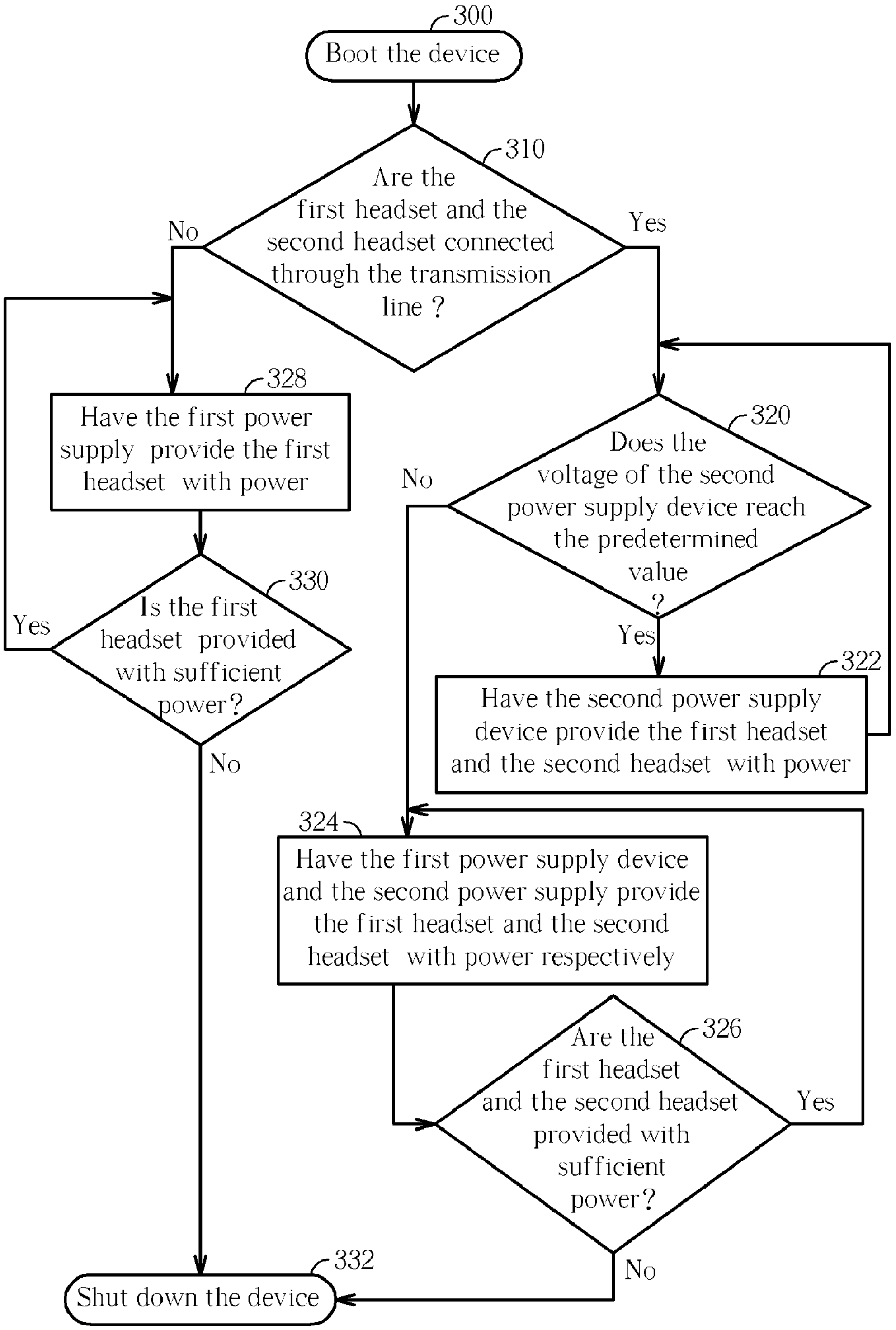
FIG. 3 is a flow chart illustrating how the headset device chooses power supplies.

Please refer to FIG. 3. FIG. 3 is a flow chart illustrating how the headset device 100 chooses power supplies. The required steps are as follows:

Step 300: Boot the device.

Step 310: Are the first headset 110 and the second headset 130 connected through the transmission line 150? If yes, go to Step 320; otherwise, go to Step 330.

Step 320: Does the voltage of the second power supply device 162 reach the predetermined value? If yes, go to Step 322; otherwise, go to Step 324.

Step 322: Have the second power supply device provide the first headset 110 and the second headset 130 with power. Next, go back to Step 320 to determine whether the voltage of the second power supply device 162 reaches the predetermined value.

Step 324: Have the first power supply device 160 and the second power supply 162 provide the first headset 110 and the second headset 130 with power respectively.

Step 326: Are the first headset 110 and the second headset 130 provided with sufficient power? If yes, go to Step 324; otherwise, go to Step 332.

Step 328: Have the first power supply 160 provide the first headset 110 with power.

Step 330: Is the first headset 110 provided with sufficient power? If yes, go to Step 332; otherwise, go to Step 328.

Step 332: Shut down the device.

In practical usage, the first headset 110 is used as a mono headset and consumes less power, so the first power supply 160 is equipped with a battery of small electric capacity. Therefore, its volume and weight are reduced efficiently. When the first headset 110 and the second headset 130 are combined together to become a stereo headset that consumes more power, the power supply device 162 is equipped with a battery of large electric capacity. In other words, when the second headset 130 is connected to the first headset 110 through the transmission line to form a stereo headset, the power line 152 in the transmission line 150 will couple the second power supply device 162 to the power switch 164. The power switch 164 will then choose the second power supply device 162 to provide the first headset 110 and the second headset 130 with operational voltage (Step 322). Thereafter, the life span of the power supply device 160 increases. If the power supply provided by the second power supply device 162 is insufficient, however, the first power supply device 160 and the second power supply device 162 will provide the first headset 110 and the second headset 130 with power respectively (Step 324). Furthermore, when the first headset 110 is used as a mono headset, the power switch 164 will choose the first power supply device 160 to provide the first headset 110 with operational voltage (Step 328).

Figure 4:
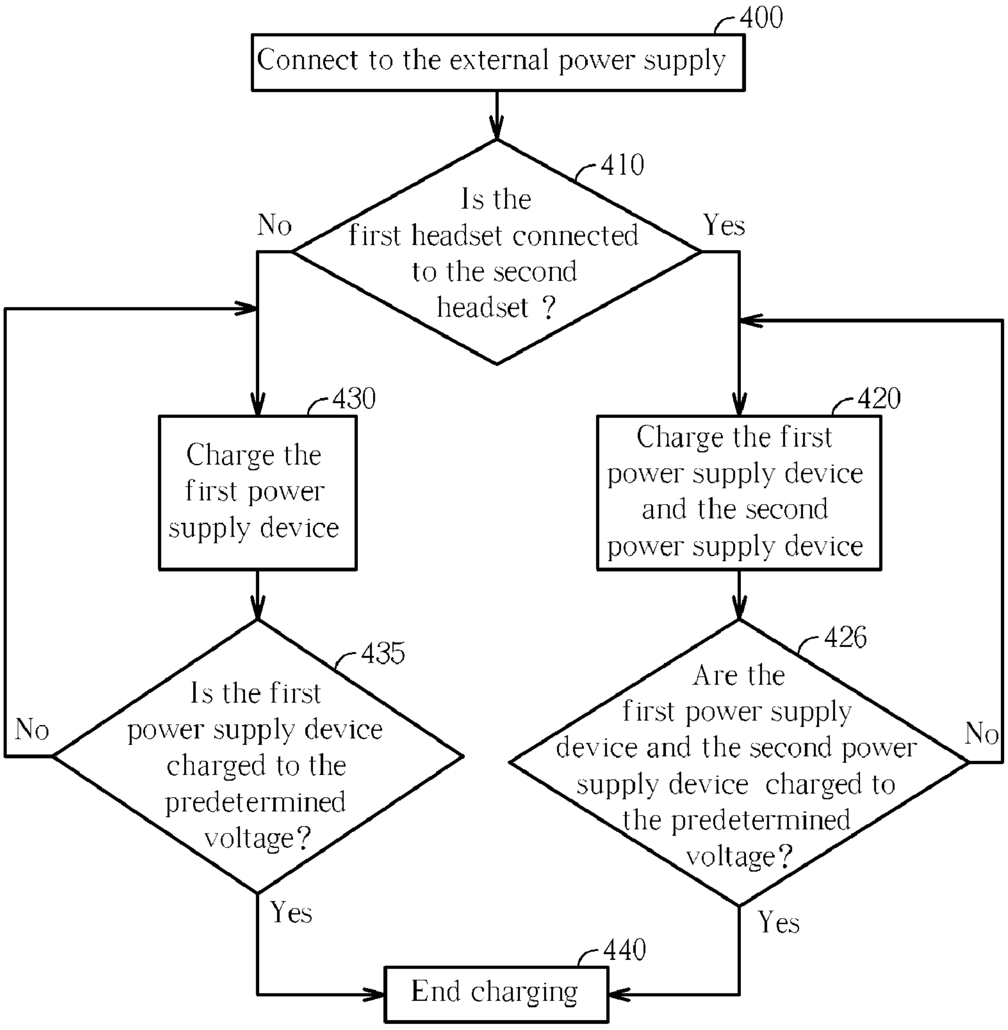
FIG. 4 is a flowchart demonstrating how the headset device is charged.

Please refer to FIG. 4. FIG. 4 is a flowchart demonstrating how the headset device 110 is charged. In the embodiment, the first power supply 160 and the second power supply 162 both include batteries and chargers, so the headset device 110 is rechargeable. The steps illustrating how the headset device 110 is charged are as follows:

Step 400: Connect to the external power supply.

Step 410: Is the first headset 110 connected to the second headset 130? If yes, go to step 420; otherwise, go to step 430.

Step 420: Charge the first power supply device 160 and the second power supply device 162.

Step 426: Are the first power supply device 160 and the second power supply device 162 charged to the predetermined voltage? If yes, go to step 440; otherwise, go to step 420

Step 430: Charge the first power supply device 160.

Step 435: Is the first power supply device 160 charged to the predetermined voltage? If yes, go to step 440; otherwise, go to step 430

Step 440: End charging.

The first headset 110 and the second headset 130 need to be connected together through the transmission line 150 before the headset device 100 is charged. Next, once an external power supply is connected to the port 160 on the first headset 110 (Step 400), the first power supply device 160 and the second power supply device are charged (Step 420) by the external power supply. If the second headset 130 is not connected to the first headset 110 through the transmission line 150, the first headset 110 can be charged alone by the external power supply (Step 400).

Furthermore, in the embodiment shown in FIG. 1, the port 122 is set onto the first headset 110, and the line reel 130 is set into the second headset 130. One end of the transmission line 150 is fixed to the second headset 130 and the other end can be plugged in or pulled out of the port 122. This is one of the embodiments for connecting the first headset 110 and the second headset 130. In another embodiment of the invention, however, a port (not shown here) is set on the second housing 132 of the second headset 130, which can be connected to the second speaker 134 for receiving the second amplified signal SA2; the two ends of the transmission line 150 can be plugged in or pulled out of the port connected to the housing of the first headset 110 or the second headset 130. In such a case, the second headset 130 does not include the line reel 136 mentioned above. This embodiment can use the techniques illustrated by FIG. 3 and FIG. 4 for choosing the power supply and charging. In another embodiment of the invention, the port 122 shown in FIG. 1 is set onto the second housing 112 of the second headset 130, and the line reel 136 is set into the first headset 130. In this case, one end of the transmission line 150 is fixed to the first headset 130 and the other end can be plugged in or pulled out of the port on the second headset 130. In the same manner, this embodiment can also use the techniques illustrated by FIG. 3 and FIG. 4 for choosing the power supply and charging. All adjustments mentioned here are within the scope of the invention.

Figure 5:
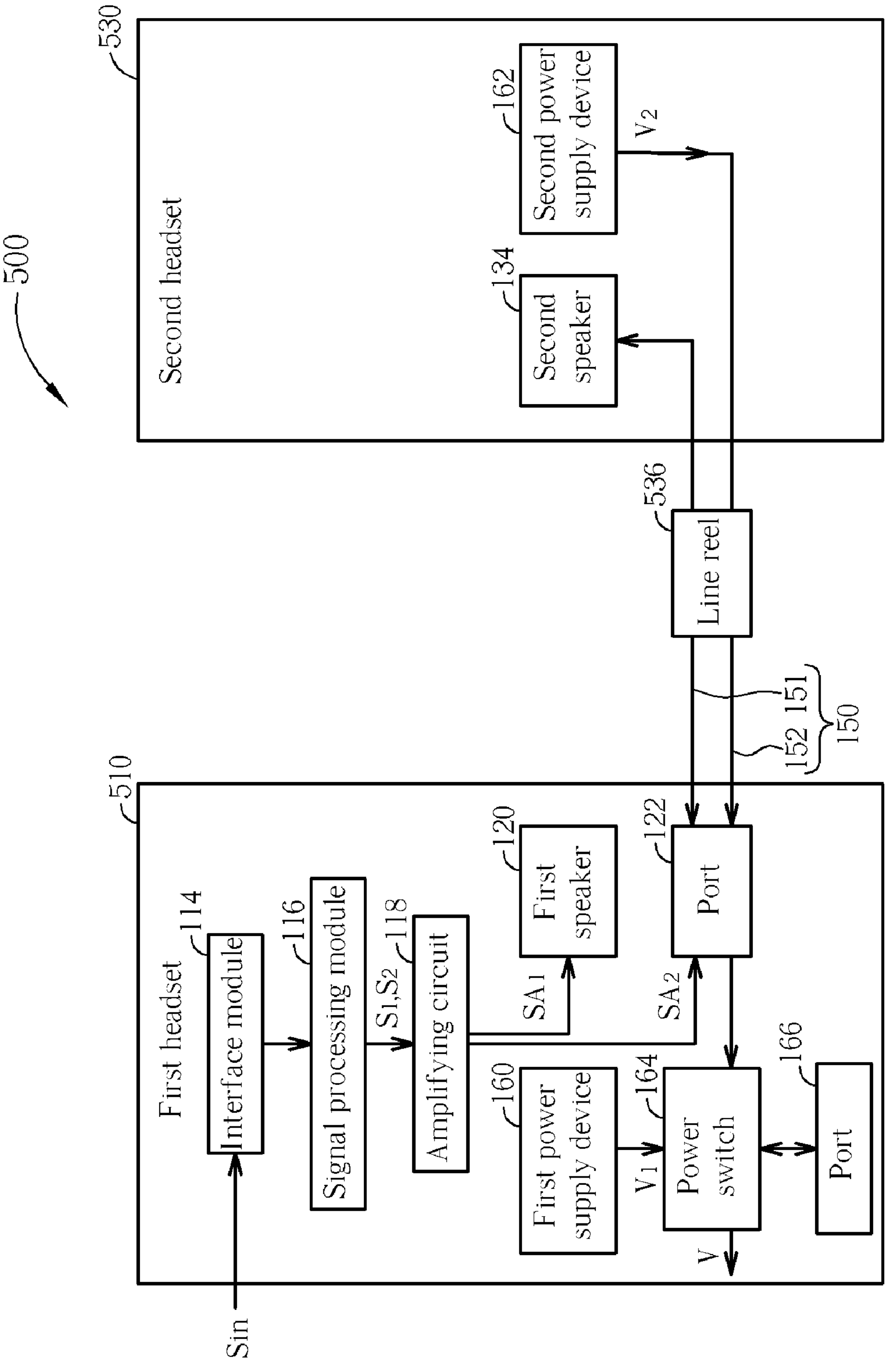
FIG. 5 is a block diagram of a headset device according to the second embodiment of the invention.

Please refer to FIG. 5. FIG. 5 is a functional schematic diagram of the headset device 500 according to the second embodiment of the invention. As shown in FIG. 5, the headset device 500 includes a first headset 510, a second headset 520, a transmission line 550 and a line reel 546. The utilization of the first headset 510, the second headset 520, and the transmission line 550 is similar to that mentioned in the first embodiment, and is therefore not described again here for the sake of brevity. The difference lies in that the second housing 532 of the second headset 530 does not include the line reel 536, which is set on the transmission line in a portable way.

Figure 6:
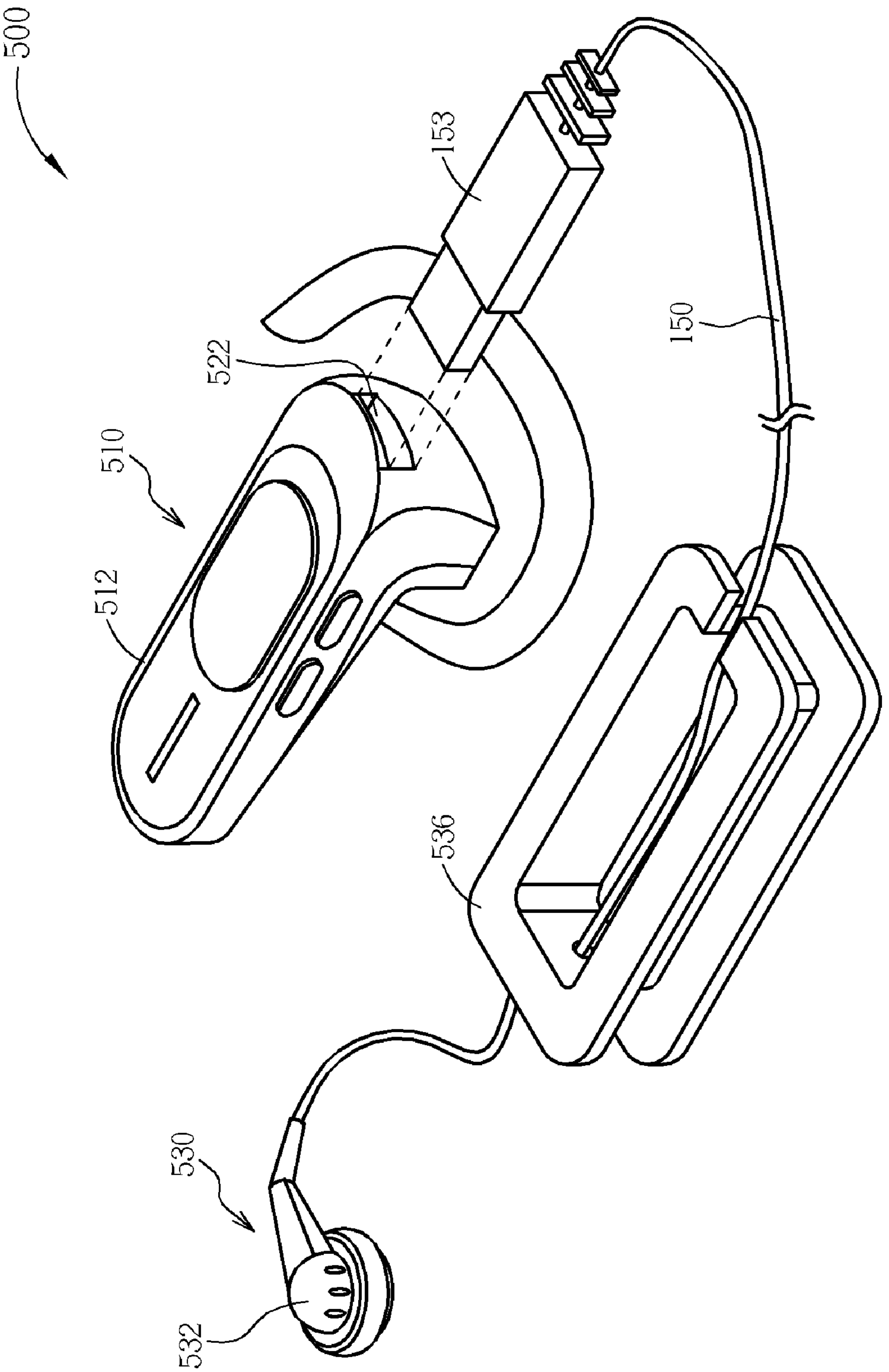
FIG. 6 is an exterior view of the headset.

Please refer to FIG. 6. FIG. 6 is an exterior view of the headset 500. As shown in FIG. 6, if the first headset 510 is used as a mono headset or a stereo headset, it functions in a similar way to the prior art and is therefore not described here for the sake of brevity. Please note that, in this embodiment, the port 122 and the port 166 can be integrated to form the port 522, which can be connected to an external power supply for charging the headset device 500.

Furthermore, in the above-mentioned embodiment, the end plug 153 of the transmission line 150 is a USB plug, which can be connected to an external power supply (ex. personal computer or a lap-top) for charging the second power supply device 162. Please note that the mechanism of charging is the same as in the first embodiment. In another embodiment of the invention, however, the second headset 130 is not equipped with the second power supply device 162, so the operation voltage required by the second headset 130 is provided by the first power supply device 160. In the same manner, the second headset 530 can be without the second power supply 162.

Figure 7:
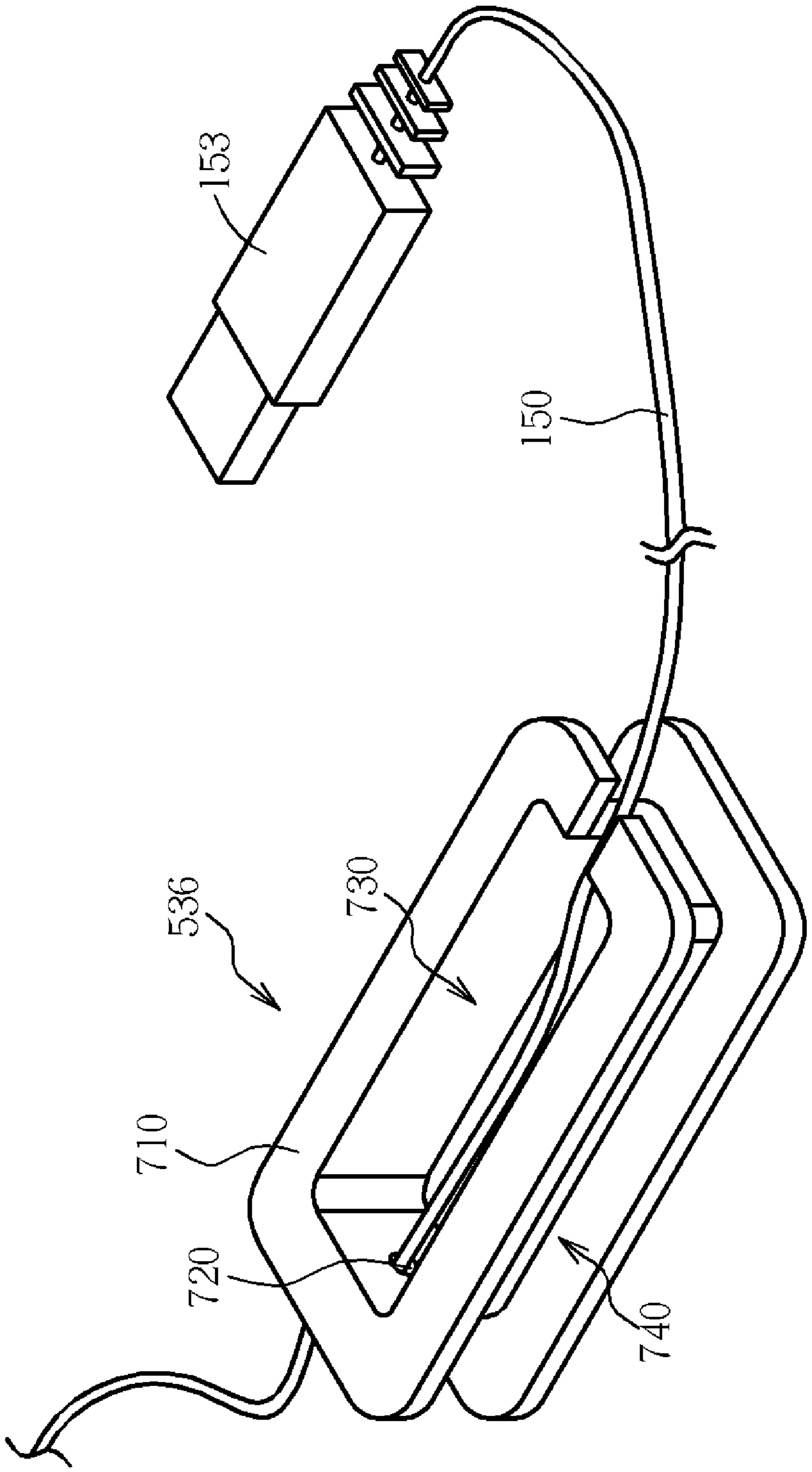
FIG. 7 is a 3-D schematic diagram of a line reel set into a transmission line according to the second embodiment of the invention.

Please refer to FIG. 7. FIG. 7 is a 3-D schematic diagram of the line reel 536 set into the transmission line 150 according to the second embodiment of the invention. As shown in FIG. 7, the line reel 536 includes a body 710, a first indentation 730 and a second indentation 740. The body 710 includes a hole 720. The body 710 is movable on the transmission 150 once the transmission line 150 goes through the hole 720. The first indentation 730 is set on the body 710 for containing the end plug 153 of the transmission line 150. The second indentation 740 is set on the lateral side of the body 710 to fix the transmission line 150 that is winded around the body 710.

Figure 8:
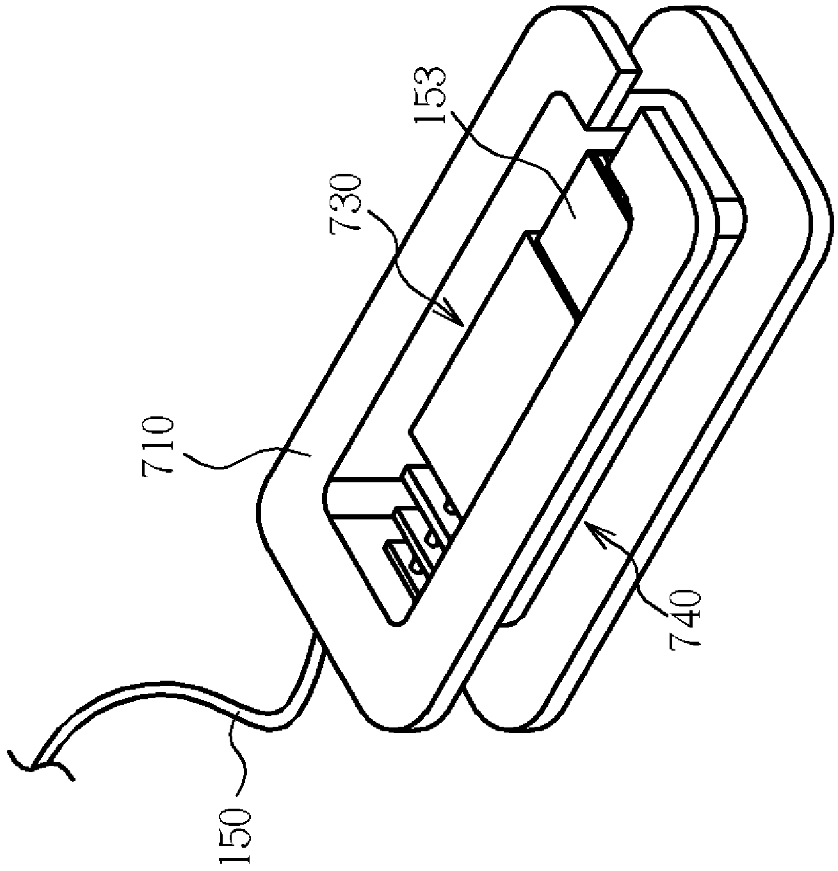
FIG. 8 is a 3-D schematic diagram illustrating how the line reel collects the transmission line according to the second embodiment of the invention.
Figure 9:
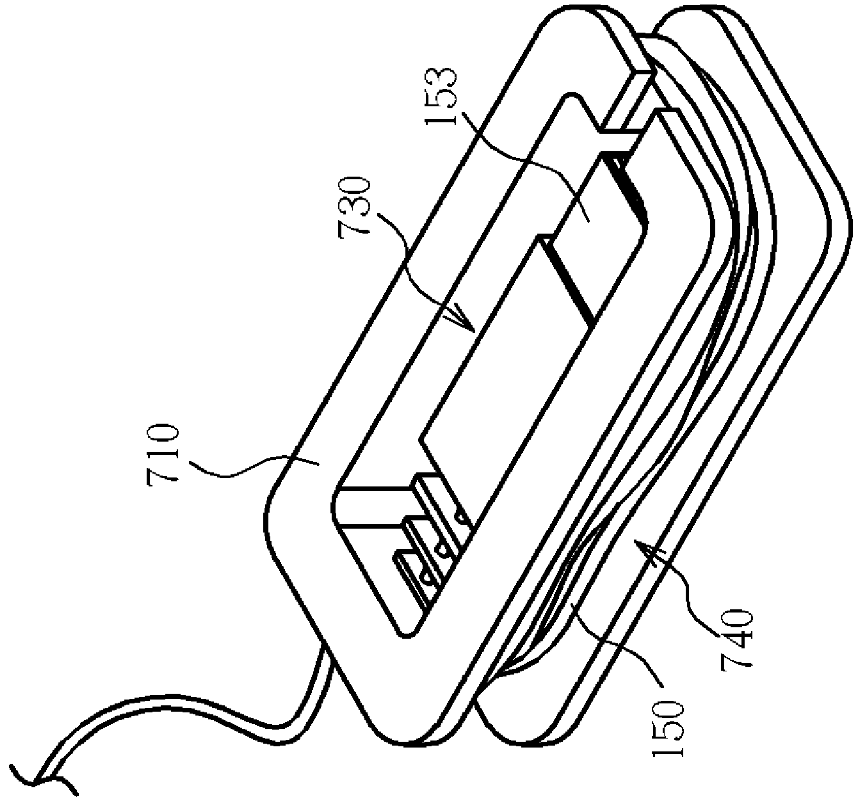
FIG. 9 is a 3-D schematic diagram of the transmission line collected into the line reel according to the second embodiment of the invention.

Please refer to FIG. 8. FIG. 8 is a 3-D schematic diagram illustrating how the line reel 536 collects the transmission line 150 according to the second embodiment of the invention. As shown in FIG. 8, when collecting the transmission line 150 with the line reel 536, the transmission line 150 is pulled away from the line reel 536 so that the end plug 153 can be fixed into the first indentation 730. Next, the transmission line is winded up onto the second indentation 740 until it is fixed. The accomplishment of the collection of the transmission line 150 is shown in FIG. 9. FIG. 9 is a 3-D schematic diagram of the transmission line 150 collected into the line reel 536 according to the second embodiment of the invention.

Please note that, in the embodiments of the invention, the interface module 114 is a wireless interface module, and more specifically a bluetooth module, which can receive the audio signal $S_{in}$ wirelessly and can make a wireless connection within the standard bluetooth band. Therefore, users can answer phone calls utilizing the headset device 100. In another embodiment that also lies within the scope of the invention, the interface module can be a wire interface module that receives the audio signal $S_{in}$ through a wire.

Compared to the prior art, the headset device of the invention is able to be separated into two earphones. Therefore, it has the advantages of convenience characterized by mono headsets, and the advantage of good audio quality characterized by stereo headsets. Users can not only use one earphone as a hands free receiver of a cell phone but can also use two earphones together as a stereo headset.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A headset device comprising:

a first headset comprising:

a first housing;

an interface module, positioned in the first housing, for receiving an audio signal;

a signal processing module, positioned in the first housing and electrically connected to the interface module, for separating the audio signal into a first channel signal and a second channel signal;

an amplifying circuit, positioned in the first housing and electrically connected to the signal processing module, for amplifying the first channel signal and the second channel signal to generate a first amplified signal and a second amplified signal respectively;

a first speaker, positioned in the first housing and electrically connected to the amplifying circuit, for outputting audio according to the first amplified signal;

a power switch having a first input end and a second input end; and a first power supply device, connected to the first input end of the power switch;

a second headset comprising:

a second housing;

a second speaker, positioned in the second housing and electrically connected to the amplifying circuit, for outputting audio according to the second amplified signal; and a second power supply device connected to the second input end of the power switch;

a transmission line, electrically connected to the amplified circuit and the second speaker, for transmitting the second amplified signal from the first headset to the second headset;

wherein when a supply voltage provided by the second power supply device reaches a predetermined threshold, the power switch causes the second power supply device to provide the first headset with an operating voltage, otherwise the power switch causes the first power supply device to provide the first headset with the operating voltage.

2. The headset device of claim 1, wherein the first headset further comprises a first port positioned on the first housing and electrically connected to the amplified circuit, for outputting the second amplified signal; the second headset further comprises a second port positioned on the second housing and electrically connected to the second speaker, for receiving the second amplified signal; and two ends of the transmission line are detachably connected to the first port and the second port.

3. The headset device of claim 1, wherein the first headset further comprises a first port positioned on the first housing and electrically connected to the amplified circuit, for outputting the second amplified signal, where one end of the transmission line is fixed to the second headset and the other end is detachably connected to the first port.

4. The headset device of claim 3, wherein when the first port is not connected to the transmission line, the first port is further connected to an external power supply to thereby charge the first power supply device.

5. The headset device of claim 4, wherein when the transmission line is not connected to the first port, the other end of the transmission line is connected to an external power supply to thereby charge the second power supply.

6. The headset device of claim 5, wherein the transmission line comprises an audio line and a power line, wherein the audio line is electrically connected to the amplifying circuit and the second speaker, and the second power supply device is connected to the second input end of the power switch through the power line.

7. The headset device of claim 4, further comprising a line reel for collecting the transmission line.

8. The headset device of claim 7, wherein the line reel comprises:

a body having a hole, wherein the transmission line passes through the hole, and the body is movable on the transmission line;

a first indentation, positioned on the body, for containing the other end of the transmission line; and a second indentation, positioned on a lateral side of the body, for fixing flexible portions of the transmission line winded around the lateral side of the body.

9. The headset device of claim 1, wherein the second headset further comprises a second port positioned on the second housing and electrically connected to the second speaker, for receiving the second amplified signal; where one end of the transmission line is fixed to the first headset and the other end is detachably connected to the second port.

10. The headset device of claim 1, wherein the interface module is a wireless interface module for receiving the audio signal wirelessly.

11. The headset device of claim 10, wherein the wireless interface module is a bluetooth module.

12. The headset device of claim 1, wherein the first headset further includes a port, positioned on the first housing, for connecting an external power supply to thereby charge the first power supply device.

13. The headset device of claim 12, wherein the transmission line comprises an audio line and a power line the power line is electrically connected to the port and the second power supply device, and when the port is connected to the external power supply, the external power supply charges the second power supply via the power line.

14. The headset device of claim 12, wherein the second headset further comprises a line reel for collecting the transmission line.

15. The headset device of claim 1, wherein the second headset further comprises a port positioned on the second housing for connecting an external power supply to thereby charge the second power supply device.

16. The headset device of claim 15, wherein the second headset further comprises a line reel for collecting the transmission line.

17. The headset device of claim 15, wherein when the port is connected to the external power supply, the external power supply charges the first power supply via the power line.

* * * * *